US012710711B2

(12) United States Patent
Tanaka

(10) Patent No.: US 12,710,711 B2
(45) Date of Patent: Aug. 18, 2026

(54) IMAGE FORMING APPARATUS

(71) Applicant: FUJIFILM Business Innovation Corp., Tokyo (JP)

(72) Inventor: Daisuke Tanaka, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/303,870

(22) Filed: Apr. 20, 2023

(65) Prior Publication Data

US 2024/0126192 A1 Apr. 18, 2024

(30) Foreign Application Priority Data

Oct. 18, 2022 (JP) ................................ 2022-167132

(51) Int. Cl.
*G03G 15/16* (2006.01)

(52) U.S. Cl.
CPC ................................ *G03G 15/1675* (2013.01)

(58) Field of Classification Search
None
See application file for complete search history.

(56) References Cited

U.S. PATENT DOCUMENTS

2015/0023681 A1* 1/2015 Shida ................ G03G 15/1605 399/66
2015/0185666 A1* 7/2015 Nakaegawa ....... G03G 15/1675 399/66
2015/0338785 A1* 11/2015 Ai ........................ G03G 15/161 399/101
2018/0253039 A1* 9/2018 Kakehi .............. G03G 15/0189
2019/0113881 A1* 4/2019 Tetsuno ............. G03G 15/1675
2019/0339639 A1* 11/2019 Shindo ............... G03G 15/1665
2022/0197192 A1* 6/2022 Kobayashi ......... G03G 15/1675
2022/0397845 A1* 12/2022 An ..................... G03G 15/5045
2024/0061364 A1* 2/2024 Matsuzaki ......... G03G 15/5004

FOREIGN PATENT DOCUMENTS

JP 2005-266686 A 9/2005
JP 2020-148945 A 9/2020

* cited by examiner

*Primary Examiner* — Sevan A Aydin
(74) *Attorney, Agent, or Firm* — Sughrue Mion, PLLC

(57) ABSTRACT

An image forming apparatus includes a circulating member to be made to circulate while carrying a toner image on a peripheral surface; a transfer member configured to nip at a nip part a recording medium that is transported and the circulating member and to transfer the toner image on the circulating member to the recording medium with a voltage being applied to the transfer member; and a controller configured to control a transfer scheme in accordance with which a voltage is to be applied to the transfer member, the controller being capable of switching the transfer scheme between constant-voltage control and constant-current control, the controller causing an image forming section configured to form an image on the circulating member to start an image forming operation under constant-voltage control selected as the transfer scheme if a length ratio defined as a ratio of a length of the recording medium in an axial direction to a length of the nip part in the axial direction is smaller than a predetermined ratio.

7 Claims, 13 Drawing Sheets

FIG. 8

| HUMIDITY | LENGTH RATIO | THIN PAPER: BASIS WEIGHT < 65 | PLAIN PAPER: 65 ≤ BASIS WEIGHT < 105 | THICK PAPER 1: 105 ≤ BASIS WEIGHT < 175 | THICK PAPER 2: 175 ≤ BASIS WEIGHT < 220 | THICK PAPER 3: 220 ≤ BASIS WEIGHT < 225 | THICK PAPER 4: 225 ≤ BASIS WEIGHT |
|---|---|---|---|---|---|---|---|
| HIGH HUMIDITY | LENGTH RATIO < 0.6 | V | V | V | V | V | V |
| | 0.6 ≤ LENGTH RATIO < 0.9 | A | A | A | A | V | V |
| | 0.9 ≤ LENGTH RATIO | A | A | A | A | A | V |
| MODERATE HUMIDITY | LENGTH RATIO < 0.6 | V | V | V | V | V | V |
| | 0.6 ≤ LENGTH RATIO < 0.9 | A | A | A | A | V | V |
| | 0.9 ≤ LENGTH RATIO | A | A | A | A | A | V |
| LOW HUMIDITY | LENGTH RATIO < 0.6 | V | V | V | V | V | V |
| | 0.6 ≤ LENGTH RATIO < 0.9 | A | A | A | A | V | V |
| | 0.9 ≤ LENGTH RATIO | A | A | A | A | A | V |

FIG. 13

| HUMIDITY | LENGTH RATIO | THIN PAPER: BASIS WEIGHT < 65 | PLAIN PAPER: 65 ≤ BASIS WEIGHT < 105 | THICK PAPER 1: 105 ≤ BASIS WEIGHT < 175 | THICK PAPER 2: 175 ≤ BASIS WEIGHT < 220 | THICK PAPER 3: 220 ≤ BASIS WEIGHT < 225 | THICK PAPER 4: 225 ≤ BASIS WEIGHT |
|---|---|---|---|---|---|---|---|
| HIGH HUMIDITY | LENGTH RATIO < 0.6 | V | V | V | V | V | V |
| | 0.6 ≤ LENGTH RATIO < 0.9 | A | A | V | V | V | V |
| | 0.9 ≤ LENGTH RATIO | A | A | A | V | V | V |
| MODERATE HUMIDITY | LENGTH RATIO < 0.6 | V | V | V | V | V | V |
| | 0.6 ≤ LENGTH RATIO < 0.9 | A | A | A | V | V | V |
| | 0.9 ≤ LENGTH RATIO | A | A | A | A | V | V |
| LOW HUMIDITY | LENGTH RATIO < 0.6 | V | V | V | V | V | V |
| | 0.6 ≤ LENGTH RATIO < 0.9 | A | A | A | A | V | V |
| | 0.9 ≤ LENGTH RATIO | A | A | A | A | A | V |

IMAGE FORMING APPARATUS

CROSS-REFERENCE TO RELATED APPLICATIONS

This application is based on and claims priority under 35 USC 119 from Japanese Patent Application No. 2022-167132 filed Oct. 18, 2022.

BACKGROUND

(i) Technical Field

The present disclosure relates to an image forming apparatus.

(ii) Related Art

An image forming apparatus disclosed by Japanese Unexamined Patent Application Publication No. 2005-266686 includes a transfer member configured to transfer a visible image on an image carrier to a recording material; a transfer-bias-applying device configured to apply a transfer bias to the transfer member; a controller configured to determine the output for image formation from the transfer-bias-applying device in accordance with the resistance at the transfer member, the resistance being detected while image formation is not underway; and a detector configured to detect the type of the recording material. The time period to be spent for determining the output for image formation from the transfer-bias-applying device is to be changed in accordance with recording-material information detected by the detector.

SUMMARY

Aspects of non-limiting embodiments of the present disclosure relate to a configuration in which the control scheme is switchable between constant-voltage control and constant-current control and that is less likely to cause defective transfer of a toner image than in a configuration in which whether to select constant-voltage control or constant-current control is to be determined in accordance with the sheet type alone.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a circulating member to be made to circulate while carrying a toner image on a peripheral surface; a transfer member configured to nip at a nip part a recording medium that is transported and the circulating member and to transfer the toner image on the circulating member to the recording medium with a voltage being applied to the transfer member; and a controller configured to control a transfer scheme in accordance with which a voltage is to be applied to the transfer member, the controller being capable of switching the transfer scheme between constant-voltage control and constant-current control, the controller causing an image forming section configured to form an image on the circulating member to start an image forming operation under constant-voltage control selected as the transfer scheme if a length ratio defined as a ratio of a length of the recording medium in an axial direction to a length of the nip part in the axial direction is smaller than a predetermined ratio.

BRIEF DESCRIPTION OF THE DRAWINGS

Exemplary embodiments of the present disclosure will be described in detail based on the following figures, wherein:

FIG. 8 illustrates a determination table provided for a determining part included in the control unit of the image forming apparatus according to the first exemplary embodiment of the present disclosure;

FIG. 13 illustrates a determination table provided for a determining part included in the control unit of the image forming apparatus according to the second exemplary embodiment of the present disclosure.

DETAILED DESCRIPTION

First Exemplary Embodiment

Figure 1:
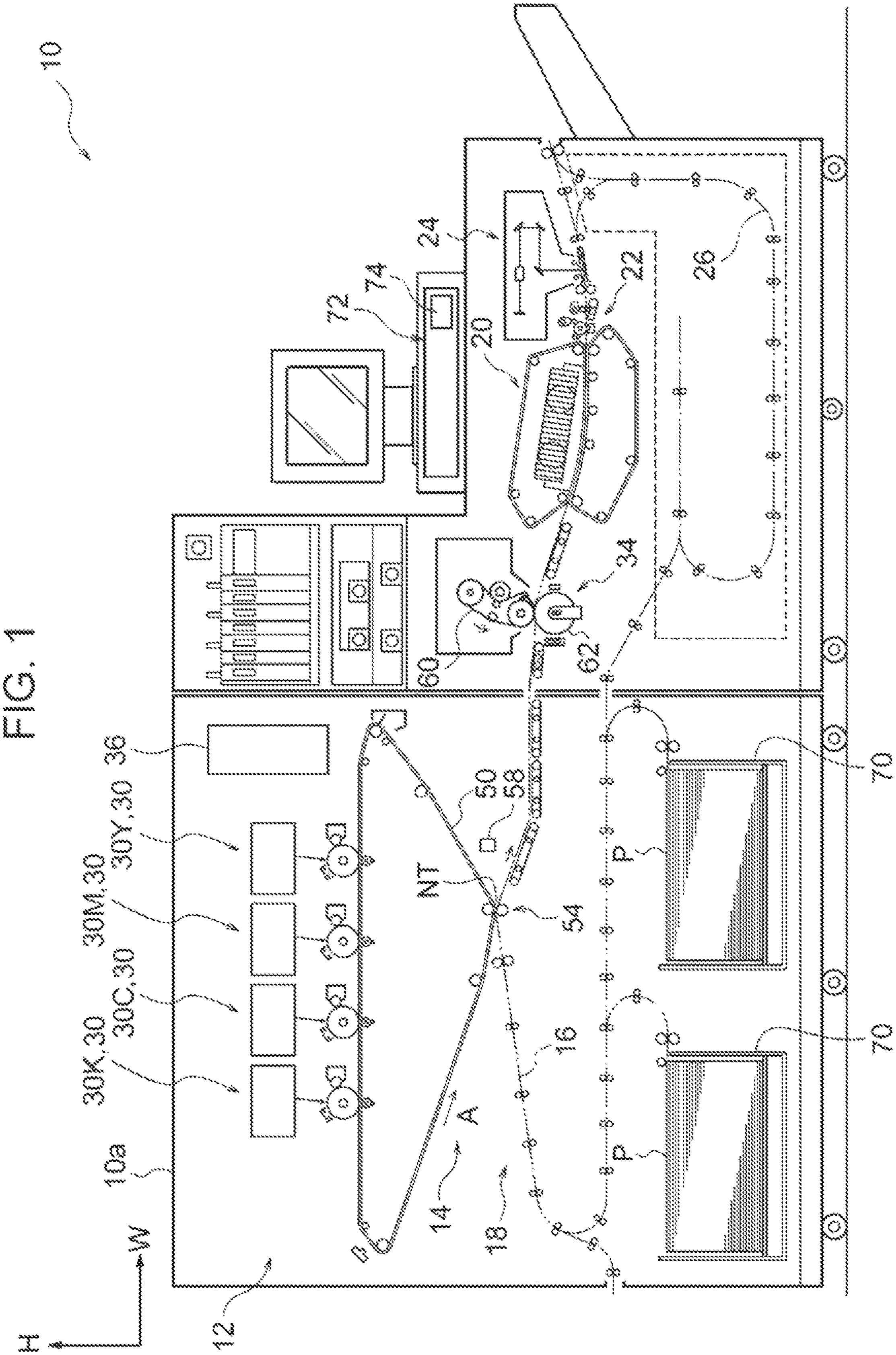
FIG. 1 schematically illustrates an image forming apparatus according to a first exemplary embodiment of the present disclosure.

An exemplary image forming apparatus according to a first exemplary embodiment of the present disclosure will now be described with reference to FIGS. 1 to 11. In the drawings, arrow H represents the vertical direction and corresponds to the apparatus top-bottom direction, arrow W represents a horizontal direction and corresponds to the apparatus width direction, and arrow D represents another horizontal direction and corresponds to the apparatus depth direction.

Overall Configuration of Image Forming Apparatus

Referring to FIG. 1, an image forming apparatus 10 includes an image forming section 12, which is configured to electrophotographically form an image; and a transporting device 18, which includes a plurality of transporting rolls (reference sings are omitted) and is configured to transport a sheet material P (an exemplary recording medium) along a transport path 16 provided for sheet materials P.

The image forming apparatus 10 further includes a cooler 20, which is configured to cool a sheet material P having an image formed thereon; a decurler 22, which is configured to decurl the sheet material P; an image tester 24, which is configured to test the image formed on the sheet material P; and a control unit 36, which is configured to control relevant elements. The control unit 36 will be described in detail separately below.

The image forming apparatus 10 further includes a reversal path 26, which is intended for duplex image formation on the sheet material P and in which the sheet material P having an image on the front side thereof is turned over before being transported to the image forming section 12 again.

In the image forming apparatus 10 configured as above, an image (toner image) formed by the image forming section 12 is received by the front side of a sheet material P that is transported along the transport path 16. The sheet material P having the image thus formed thereon passes through the cooler 20, the decurler 22, and the image tester 24 in that order and is outputted to the outside of an apparatus body 10*a*.

If another image is to be formed on the back side of the sheet material P, the sheet material P having the image formed on the front side thereof is transported along the reversal path 26 and is further transported to the image forming section 12, where another image is formed on the back side of the sheet material P.

Image Forming Section 12

As illustrated in FIG. 1, the image forming section 12 includes a plurality of toner-image-forming units 30, which are configured to form respective toner images in different colors; and a transfer section 14, which includes a transfer belt 50 and is configured to receive the toner images by the peripheral surface of the transfer belt 50 and to transfer the toner images to a sheet material P. The image forming section 12 further includes a fixing device 34, which is configured to fix the toner images on the sheet material P that are transferred to the sheet material P by the transfer section 14. The transfer section 14 will be described in detail separately below.

The toner-image-forming units 30 are each configured to form a toner image in a corresponding one of the different colors. In the present exemplary embodiment, a total of four toner-image-forming units 30 are provided for respective colors of yellow (Y), magenta (M), cyan (C), and black (K). Characters Y, M, C, and K provided in FIG. 1 represent the respective colors. Hereinafter, if elements provided for the respective colors of yellow (Y), magenta (M), cyan (C), and black (K) do not need to be distinguished from one another, the suffixes Y, M, C, and K given to reference signs of such elements are omitted.

Figure 2:
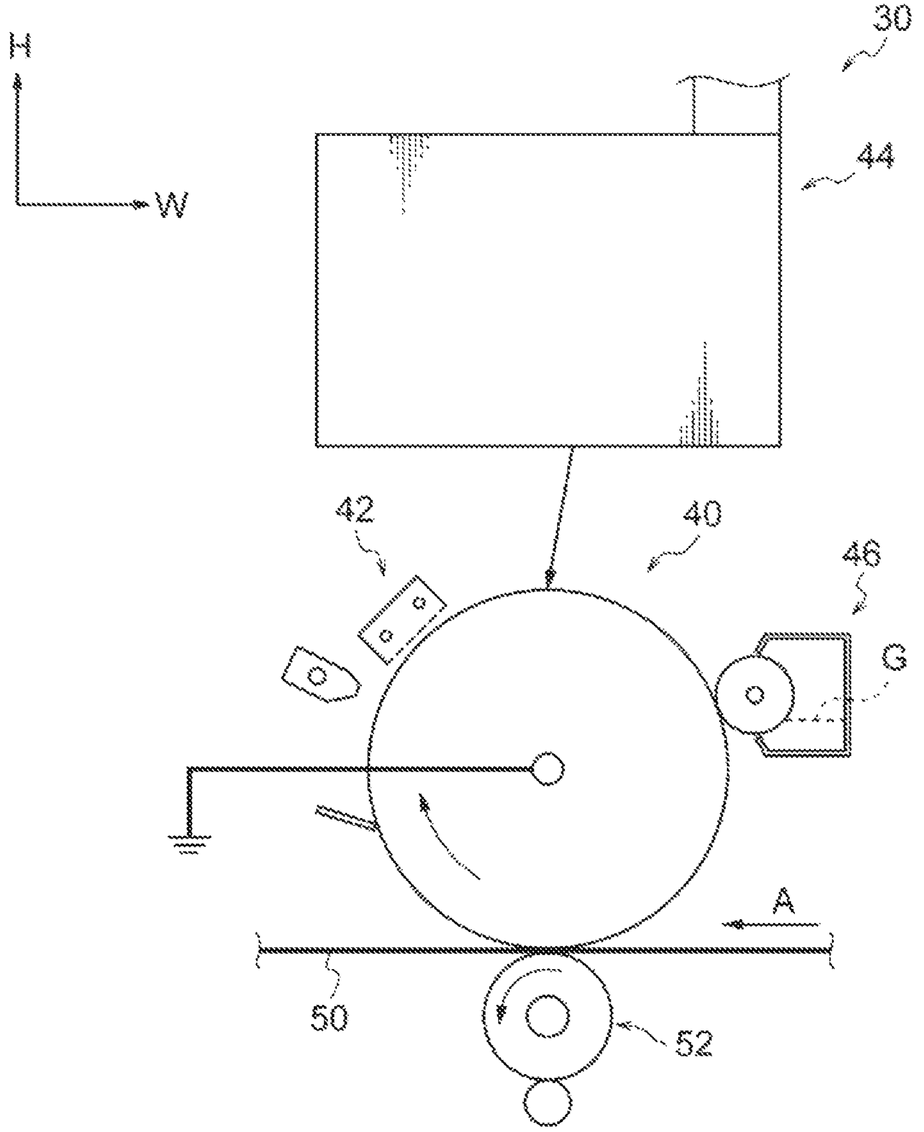
FIG. 2 schematically illustrates a toner-image-forming unit included in the image forming apparatus according to the first exemplary embodiment of the present disclosure.

The toner-image-forming units 30 for the respective colors basically have the same configuration excluding toners to be used and each include, as illustrated in FIG. 2, an image carrier 40, which is rotatable and has a cylindrical shape; and a charging device 42, which is configured to charge the image carrier 40. The toner-image-forming units 30 each further include an exposure device 44, which is configured to form an electrostatic latent image by exposing the charged image carrier 40 to exposure light; and a developing device 46, which is configured to develop the electrostatic latent image into a toner image with a developer G containing a toner. The developer G employed in the present exemplary embodiment is a two-component developer containing a toner and a carrier.

The image carriers 40 for the respective colors are grounded and are in contact with the transfer belt 50 (details will be described separately below) that is to be made to circulate. As illustrated in FIG. 1, the toner-image-forming units 30 for yellow (Y), magenta (M), cyan (C), and black (K) are arranged horizontally side by side in that order from the upstream side in the direction of circulation (represented by arrow A in FIG. 1) of the transfer belt 50.

As illustrated in FIG. 1, the fixing device 34 includes a fixing belt 60, which is stretched over a plurality of rolls (reference signs are omitted) and is to be heated; and a pressing roll 62, which is configured to press the sheet material P against the fixing belt 60.

In the above configuration, the sheet material P having toner images transferred thereto is transported while being nipped between the fixing belt 60 that circulates and the pressing roll 62, whereby the toner images on the sheet material P are fixed.

Transporting Device 18

As illustrated in FIG. 1, the transporting device 18 includes containers 70, each of which contains sheet materials P; and a plurality of transporting rolls (reference signs are omitted), with which each of the sheet materials P contained in the containers 70 is to be transported along the transport path 16.

Feature Configuration

Features including the transfer section 14 and the control unit 36 will now be described.

Transfer Section 14

Figure 3:
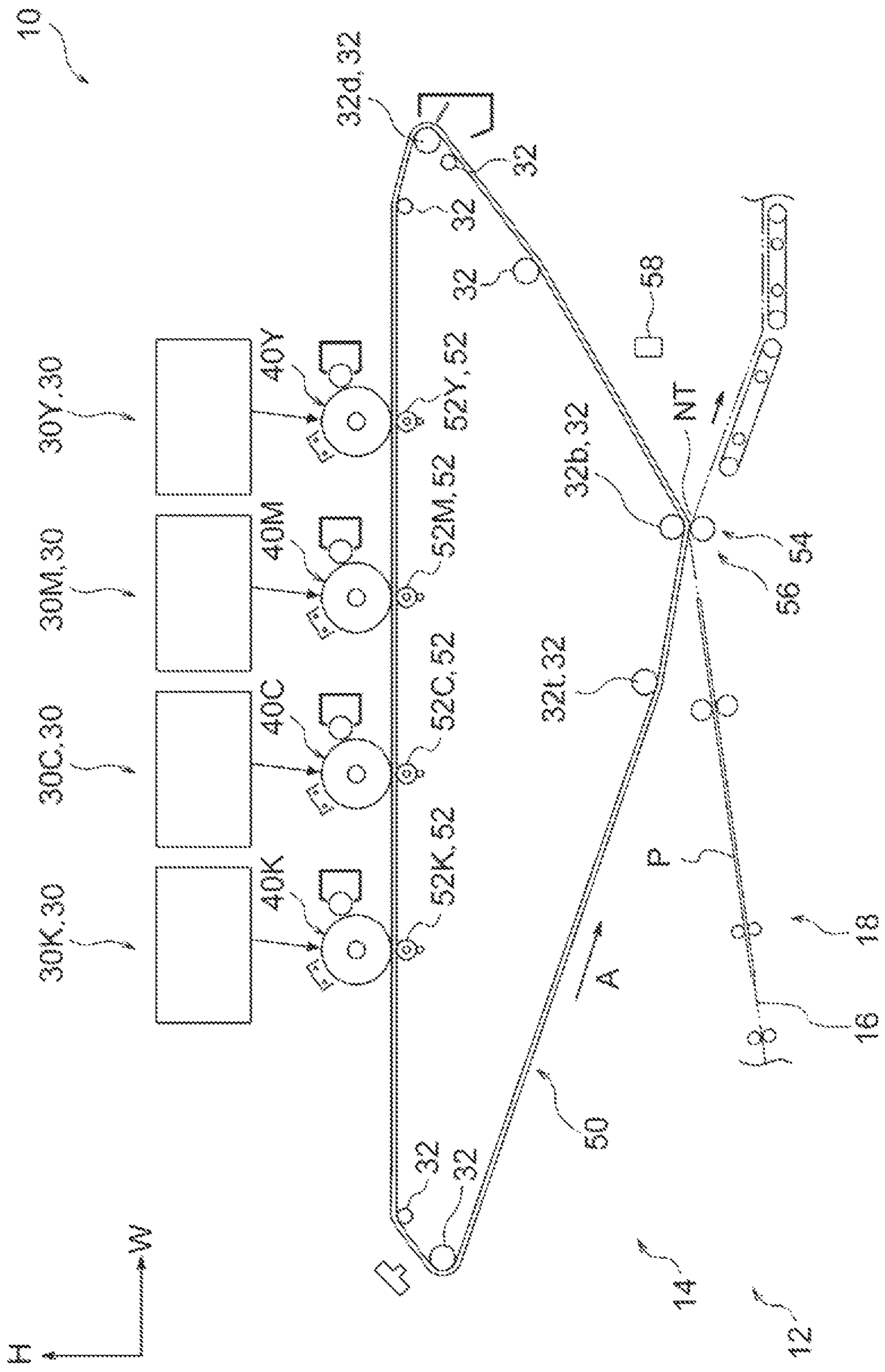
FIG. 3 schematically illustrate a transfer section included in the image forming apparatus according to the first exemplary embodiment of the present disclosure.

Referring to FIG. 3, the transfer section 14 includes the transfer belt 50; a plurality of rolls 32, over which the transfer belt 50 is stretched; and first-transfer rolls 52, with which the toner images formed on the respective image carriers 40 are to be transferred to the peripheral surface of the transfer belt 50. The transfer section 14 further includes a second-transfer roll 54, with which the toner images received by the transfer belt 50 are to be transferred to a sheet material P; a high-voltage power source 68 (see FIG. 4); and a voltmeter 78, which is configured to measure a transfer voltage that is generated between the second-transfer roll 54 and a roll 32*b*. The transfer belt 50 is an exemplary circulating member.

Transfer Belt 50

As illustrated in FIG. 3, the transfer belt 50 has an endless shape and is stretched over the plurality of rolls 32. Seen in the apparatus depth direction, the transfer belt 50 is stretched into an inverted obtuse-triangular shape elongated in the apparatus width direction. In the present exemplary embodiment, the transfer belt 50 is made of, for example, a material obtained by dispersing carbon in polyimide. The transfer belt 50 has a volume resistivity of 12.5 [log Ωcm].

Rolls 32

As illustrated in FIG. 3, the transfer section 14 includes the plurality of rolls 32. The plurality of rolls 32 include a roll 32*d*, which is located on one side (the right side in FIG. 3) in the apparatus width direction and to which a turning force is to be transmitted from a motor (not illustrated) to cause the transfer belt 50 to circulate in the direction of arrow A (counterclockwise in FIG. 3).

The plurality of rolls 32 further include the roll 32*b*, which defines the obtuse bottom vertex of the obtuse-triangular transfer belt 50 and is located across the transfer belt 50 from the second-transfer roll 54 to be described separately below. A voltage is to be applied to the roll 32*b*. In the present exemplary embodiment, the roll 32*b* is, for example, an elastic roll having an outside diameter of 28 [mm] and a length of 340 [mm] in the axial direction. Furthermore, the roll 32*b* exhibits a surface resistance of 7.3 [log Ω/sq] and a surface hardness of 53 [degrees] in Asker C hardness.

The plurality of rolls 32 further include a roll 32*t*, which is located next to the roll 32*b* on the upstream side in the direction of circulation of the transfer belt 50 and applies a tension to the transfer belt 50.

First-Transfer Rolls 52

As illustrated in FIG. 3, the first-transfer rolls 52 are located across the transfer belt 50 from the respective image carriers 40 provided for the respective colors.

In the above configuration, when the first-transfer rolls 52 for the respective colors are each supplied with a transfer current, a transfer electric field is generated between the first-transfer roll 52 and a corresponding one of the image carriers 40. The transfer electric field causes the toner image on the image carrier 40 to be transferred to the peripheral surface of the transfer belt 50.

Second-Transfer Roll 54

Figure 4:
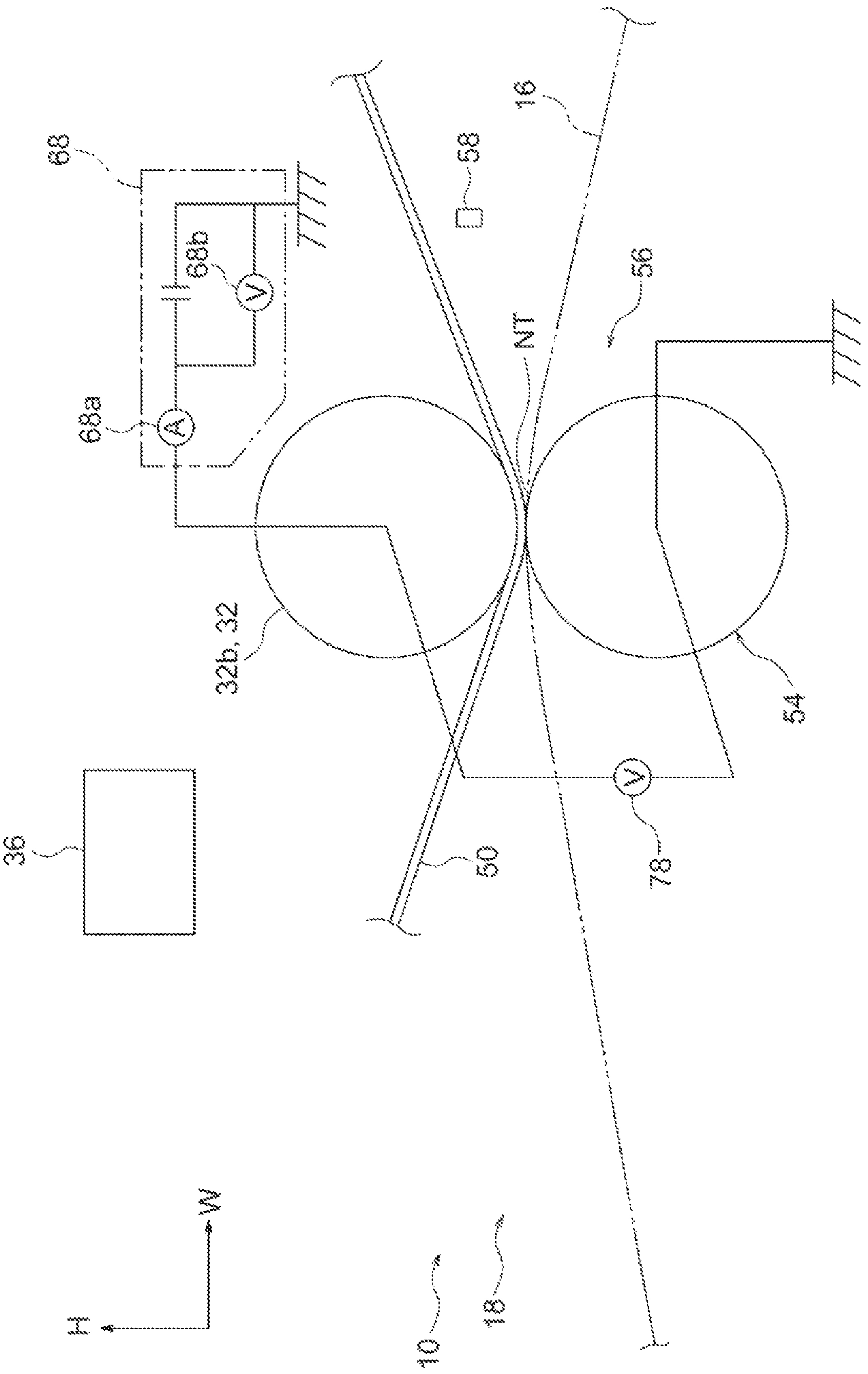
FIG. 4 is a schematic front view of relevant elements provided around a second-transfer part of the image forming apparatus according to the first exemplary embodiment of the present disclosure.
Figure 5:
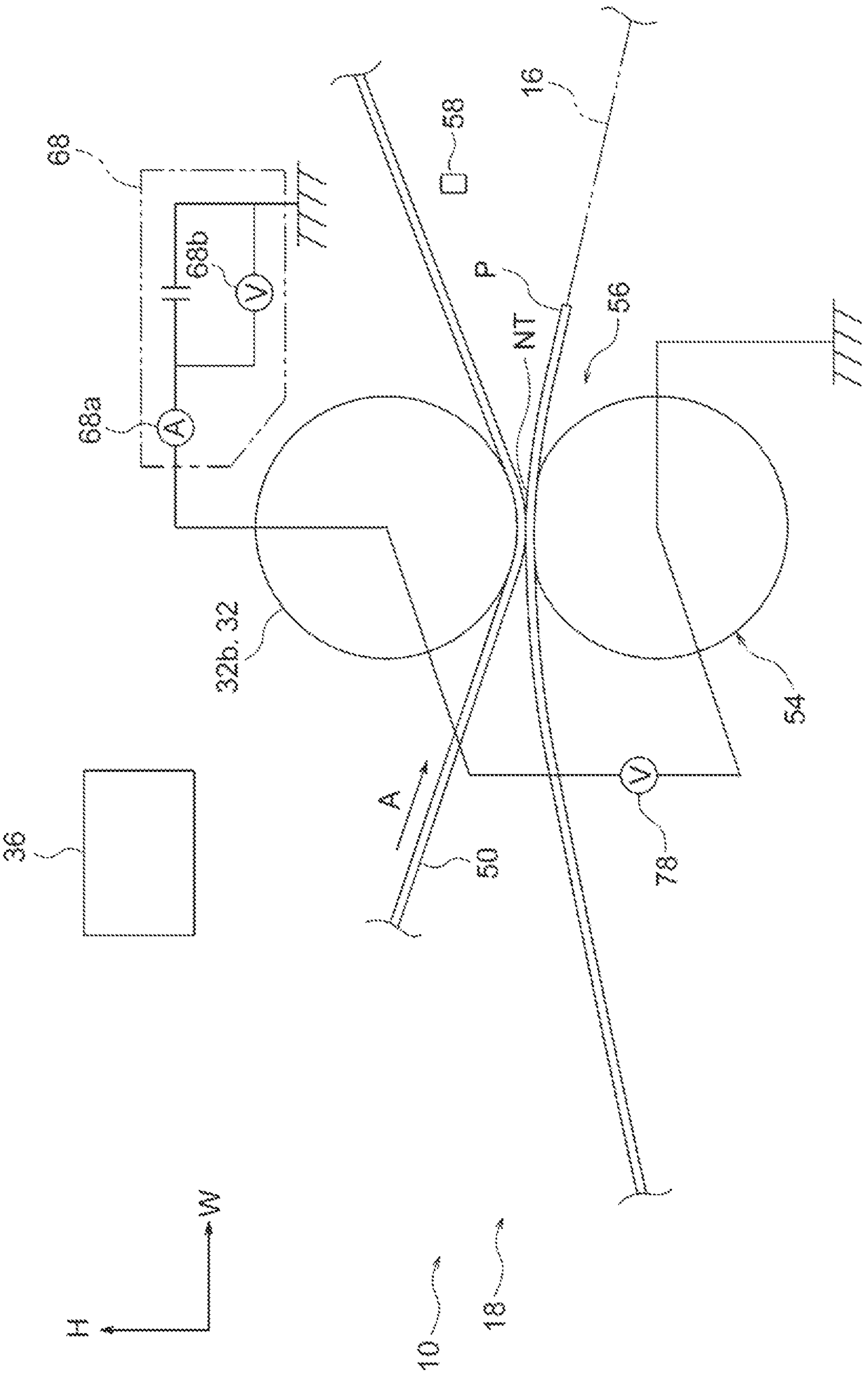
FIG. 5 is another schematic front view of relevant elements provided around the second-transfer part of the image forming apparatus according to the first exemplary embodiment of the present disclosure.

Referring to FIG. 4, the second-transfer roll 54 is grounded and cooperates with the roll 32*b* to nip the transfer belt 50 therebetween. In the present exemplary embodiment, the second-transfer roll 54 is, for example, an elastic roll having an outside diameter of 28 [mm] and a length of 340 [mm] in the axial direction. Furthermore, the second-transfer roll 54 exhibits a resistance of 6.3 [log Ω].

High-Voltage Power Source 68

The high-voltage power source 68 has a function of applying a direct-current voltage to the roll 32*b* to cause a current to flow through the roll 32*b*. As illustrated in FIG. 4, the high-voltage power source 68 includes an ammeter 68*a*, which is capable of monitoring the current flowing through the roll 32*b*; and a voltmeter 68*b*, which is capable of monitoring the voltage applied to the roll 32*b*.

In the above configuration, the sheet material P that is transported while being nipped between the transfer belt 50 and the second-transfer roll 54 at a second-transfer part NT is pressed toward the transfer belt 50. In other words, the roll 32*b* and the second-transfer roll 54 nip the sheet material P and the transfer belt 50 therebetween. When a voltage is applied between the second-transfer roll 54 and the roll 32*b*, a current flows between the second-transfer roll 54 and the roll 32*b*, whereby a transfer electric field is generated. The transfer electric field causes the toner images carried by the peripheral surface of the transfer belt 50 to be transferred at the second-transfer part NT to a sheet material P that is transported therethrough. The second-transfer part NT is an exemplary nip part.

The above configuration provides a transfer member 56, or a transfer means, in which a sheet material P that is transported therethrough and the transfer belt 50 are nipped between the second-transfer roll 54 and the roll 32*b*, whereby the toner images carried by the peripheral surface of the transfer belt 50 are transferred to the sheet material P. The second-transfer part NT has a length of 340 [mm] in the axial direction.

Other Elements

Referring to FIG. 1, the image forming apparatus 10 includes a user interface 72, through which the image forming apparatus 10 and the user communicate with each other. The user interface 72 includes an input unit 74, on which medium information such as the size, the basis weight, and the sheet type of the sheet materials P contained in each of the containers 70 is to be inputted.

Control Unit 36

The control unit 36 is configured to control the high-voltage power source 68 in accordance with information, such as the medium information, inputted on the input unit 74 by the user. How the control unit 36 controls the high-voltage power source 68 will be described separately below, together with a feature operation of the control unit 36.

Hardware Configuration of Control Unit 36

Figure 7B:
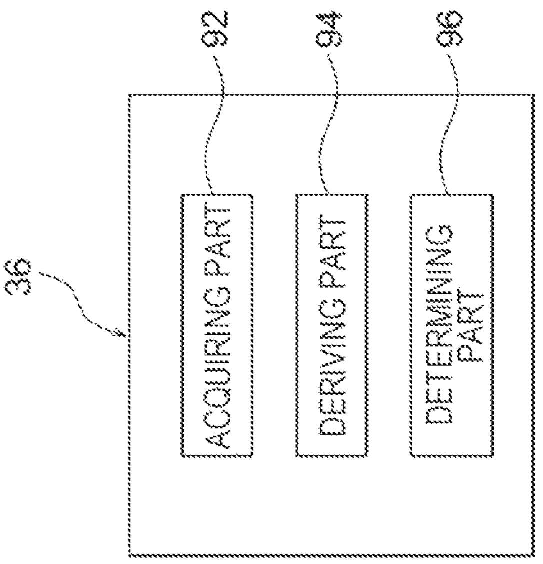
FIGS. 7A and 7B are block diagrams illustrating a hardware configuration and a functional configuration, respectively, of a control unit included in the image forming apparatus according to the first exemplary embodiment of the present disclosure.
Figure 7A:
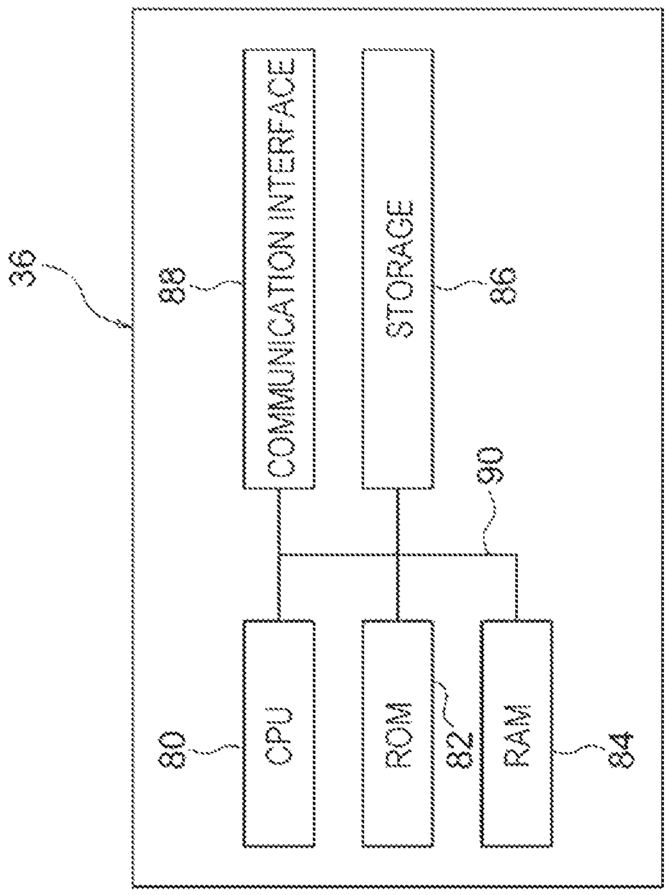

Referring to FIG. 7A, the control unit 36 includes a central processing unit (CPU) 80, a read-only memory (ROM) 82, a random access memory (RAM) 84, a storage 86, and a communication interface (I/F) 88. The foregoing elements are connected to one another with a bus 90, thereby being capable of communicating with one another. The CPU 80 is an exemplary controller.

The CPU 80 is configured to execute relevant programs and to control relevant elements. Specifically, the CPU 80 is configured to read a program from the ROM 82 or the storage 86 and to execute the program by using the RAM 84 as a work area. The CPU 80 is configured to control relevant elements and relevant arithmetic processing operations in accordance with programs stored in the ROM 82 or the storage 86. In the present exemplary embodiment, for example, the ROM 82 or the storage 86 stores programs including a determination program for determining whether to select constant-current control or constant-voltage control as a transfer scheme. That is, the transfer scheme is switchable by the CPU 80 between constant-voltage control and constant-current control.

The ROM 82 stores relevant programs and relevant data. The RAM 84 serves as a work area and temporarily stores a program or data. The storage 86 is a hard disk drive (HDD) or a solid-state drive (SSD) and stores relevant programs and relevant data, including an operating system. The communication interface 88 is an interface for allowing communication between the control unit 36 and relevant elements of the image forming apparatus 10. If, for example, the control unit 36 is detachable from the apparatus body 10*a*, a standard such as Ethernet (a registered trademark), a fiber-distributed data interface (FDDI), or Wi-Fi (a registered trademark) is employed.

To execute the above processing programs, the control unit 36 implements relevant functions by using the above hardware resources. Now, a configuration of such functions to be implemented by the control unit 36 will be described.

Functional Configuration of Control Unit 36

Referring to FIG. 7B, the control unit 36 includes an acquiring part 92, a deriving part 94, and a determining part 96. Such functions are implemented by the CPU 80 when the CPU 80 reads and executes the processing programs stored in the ROM 82 or the storage 86.

The acquiring part 92 is configured to acquire from the voltmeter 78 the following information: in-apparatus humidity information on the in-apparatus humidity measured by a hygrometer 58 (see FIG. 4), which is provided in the apparatus body 10*a* and is configured to measure relative humidity; medium information on the sheet materials P contained in the containers 70; and voltage information on the voltage generated between the second-transfer roll 54 and the roll 32$b$. The deriving part 94 is configured to derive a voltage division ratio γ, which is taken as an index for determining whether to select constant-current control or constant-voltage control as the transfer scheme. The determining part 96 is configured to determine whether to select constant-current control or constant-voltage control as the transfer scheme in accordance with the medium information or the voltage division ratio γ.

When an image forming operation is started, the determining part 96 determines whether to select constant-current control or constant-voltage control as the transfer scheme in accordance with a determination table, illustrated in FIG. 8, stored in the storage 86. The determination table illustrated in FIG. 8 is provided for the determination of whether to select constant-voltage control (represented by V in the table) or constant-current control (represented by A in the table). The determination table will now be described.

The in-apparatus humidity is classified into a range of high humidity, a range of moderate humidity, and a range of low humidity. Furthermore, the ratio of the length of the sheet material P in the axial direction to the length of the second-transfer part NT in the axial direction is defined as length ratio and is classified into a plurality of ranges for each range of humidity. Specific ranges of length ratio are as follows: a length ratio smaller than 0.6, a length ratio of 0.6 or greater but smaller than 0.9, and a length ratio of 0.9 or greater. Furthermore, the basis weight of the sheet material P is classified into a plurality of ranges for each range of length ratio.

According to the determination table, in the range of length ratio smaller than 0.6, constant-voltage control is selected regardless of the in-apparatus humidity and the basis weight of the sheet material P. The length ratio of 0.6 is an exemplary predetermined ratio.

According to the determination table, in each of the ranges of high humidity, moderate humidity, and low humidity and in the range of length ratio of 0.6 or greater but smaller than 0.9, constant-current control is selected for thin paper, plain paper, thick paper 1, and thick paper 2. Furthermore, in each of the ranges of high humidity, moderate humidity, and low humidity and in the range of length ratio of 0.6 or greater but smaller than 0.9, constant-voltage control is selected for thick paper 3 and thick paper 4.

Herein, thin paper refers to a sheet material P having a basis weight smaller than 65 [g/m2], plain paper refers to a sheet material P having a basis weight of 65 [g/m2] or greater but smaller than 105 [g/m2], and thick paper 1 refers to a sheet material P having a basis weight of 105 [g/m2] or greater but smaller than 175 [g/m2]. Furthermore, thick paper 2 refers to a sheet material P having a basis weight of 175 [g/m2] or greater but smaller than 220 [g/m2], thick paper 3 refers to a sheet material P having a basis weight of 220 [g/m2] or greater but smaller than 225 [g/m2], and thick paper 4 refers to a sheet material P having a basis weight of 225 [g/m2] or greater.

In short, if the length ratio is 0.6 or greater but smaller than 0.9, constant-current control is selected for a basis weight smaller than 220 [g/m2], whereas constant-voltage control is selected for a basis weight of 220 [g/m2] or greater. For a length ratio of 0.6 or greater but smaller than 0.9, the basis weight of 220 [g/m2] is an exemplary predetermined basis weight.

According to the determination table, in each of the ranges of high humidity, moderate humidity, and low humidity and in the range of length ratio of 0.9 or greater, constant-current control is selected for thin paper, plain paper, thick paper 1, thick paper 2, and thick paper 3. Furthermore, in each of the ranges of high humidity, moderate humidity, and low humidity and in the range of length ratio of 0.9 or greater, constant-voltage control is selected for thick paper 4.

In short, if the length ratio is 0.9 or greater, constant-current control is selected for a basis weight smaller than 225 [g/m2], whereas constant-voltage control is selected for a basis weight of 225 [g/m2] or greater. For a length ratio of 0.9 or greater, the basis weight of 225 [g/m2] is an exemplary predetermined basis weight.

The table illustrated in FIG. 8 is created on the basis of the following concept.

Figure 6A:
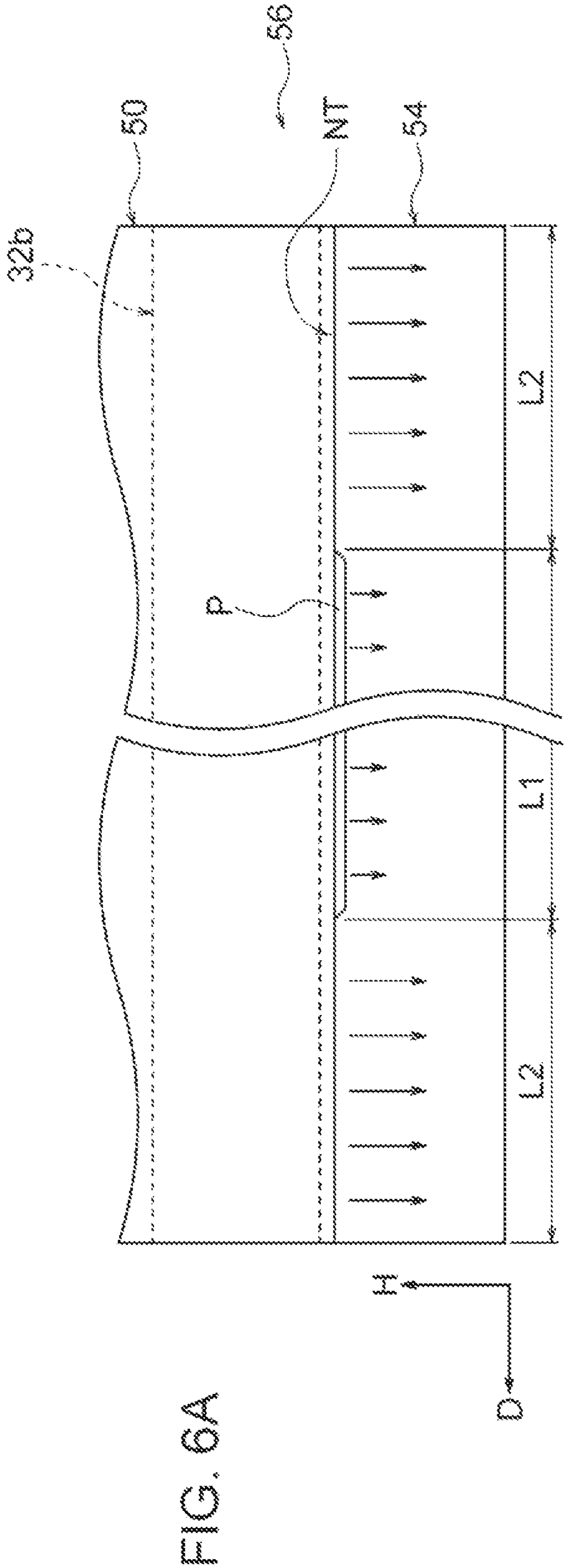
FIGS. 6A and 6B are schematic side views of relevant elements provided around the second-transfer part of the image forming apparatus according to the first exemplary embodiment of the present disclosure.
Figure 6B:
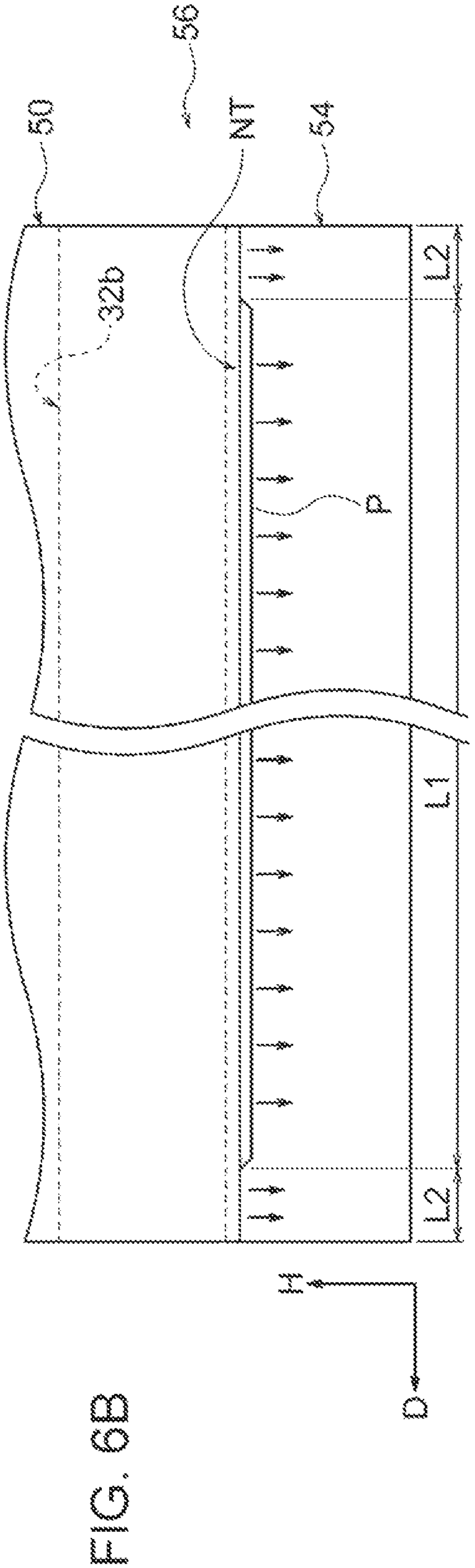

FIG. 6A illustrates a case where the length ratio defined as the ratio of the length of the sheet material P in the axial direction to the length of the second-transfer part NT in the axial direction is small. FIG. 6B illustrates a case where the length ratio is large. In the case of a small length ratio illustrated in FIG. 6A, the area (each area L2 in FIGS. 6A and 6B) where the current flows from the roll 32$b$ to the second-transfer roll 54 without flowing through the sheet material P is wider than in the case of a large length ratio illustrated in FIG. 6B. Hereinafter, as a matter of convenience of description, the area where the current flows from the roll 32$b$ to the second-transfer roll 54 through the sheet material P is denoted by L1, and the area where the current flows from the roll 32$b$ to the second-transfer roll 54 without flowing through the sheet material P is denoted by L2.

In the above configuration, when a voltage is applied to the roll 32$b$, the sheet material P acts as a resistance. Therefore, in the case where the area L2 is wide, that is, the case of a small length ratio (see FIG. 6A), a greater amount of current flows through the area L2 than in the case where the area L2 is narrow, that is, the case of a large length ratio (see FIG. 6B). Accordingly, a greater amount of current leaks from the two ends of the sheet material P. Therefore, if the area L2 is wide, that is, if the length ratio is small, constant-voltage control is to be selected.

On the other hand, in the case where the area L2 is narrow, that is, the case of a large length ratio (see FIG. 6B), the difference between the amount of current flowing through the area L2 and the amount of current flowing through the area L1 is smaller than in the case where the area L2 is wide, that is, the case of a small length ratio (see FIG. 6A). Therefore, if the area L2 is narrow, that is, if the length ratio is large, constant-current control is to be selected.

Furthermore, in the case of a large basis weight, the sheet material P exhibits a greater resistance than in the case of a small basis weight. In other words, in the case of a large basis weight, the leakage of the current from the two ends of the sheet material P is greater than in the case of a small basis weight. Therefore, if the basis weight is large, constant-voltage control is to be selected.

Feature Operation

Figure 9:
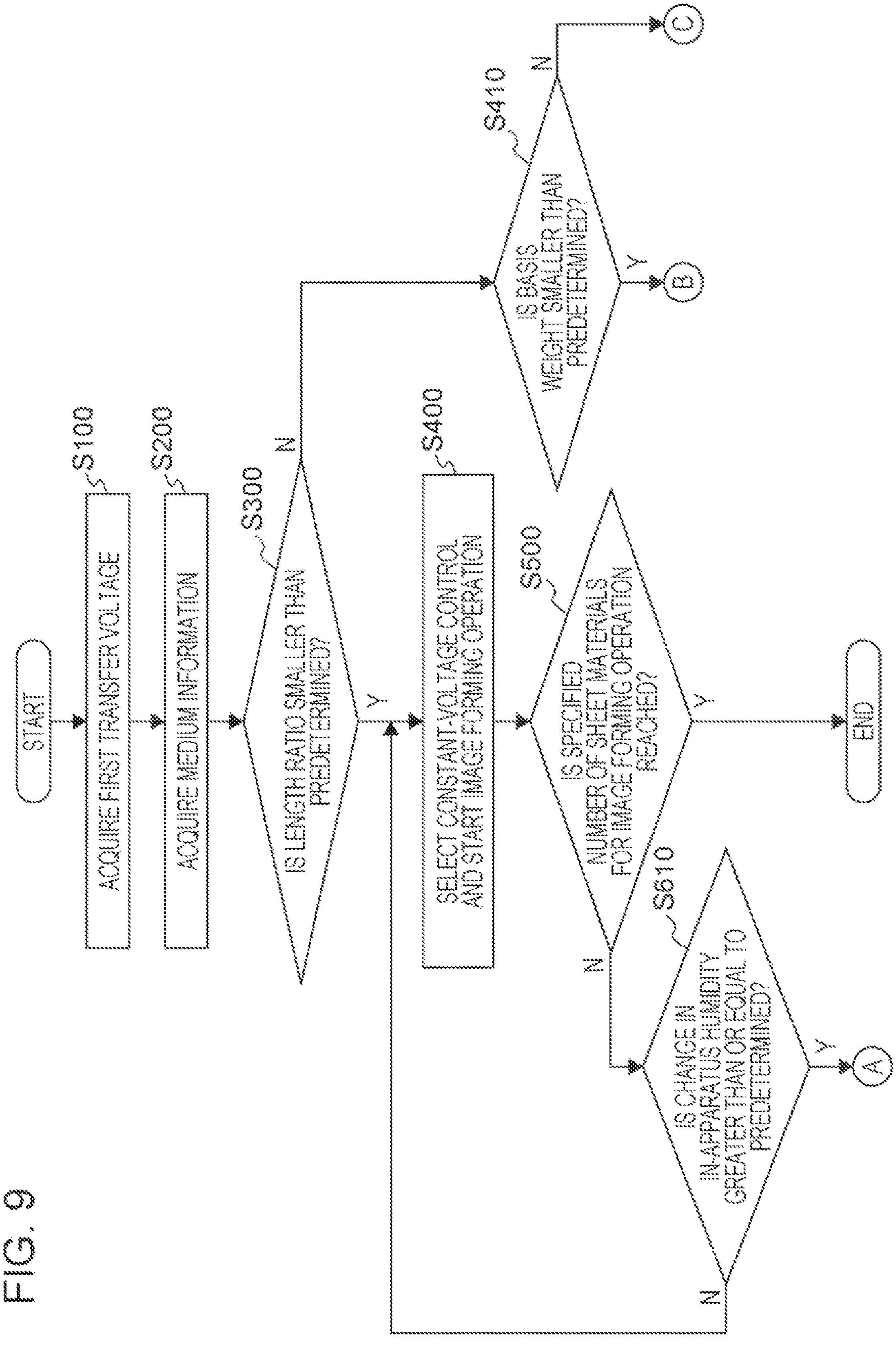
FIG. 9 is a flow chart illustrating how to determine a transfer scheme to be selected in the image forming apparatus according to the first exemplary embodiment of the present disclosure.
Figure 10:
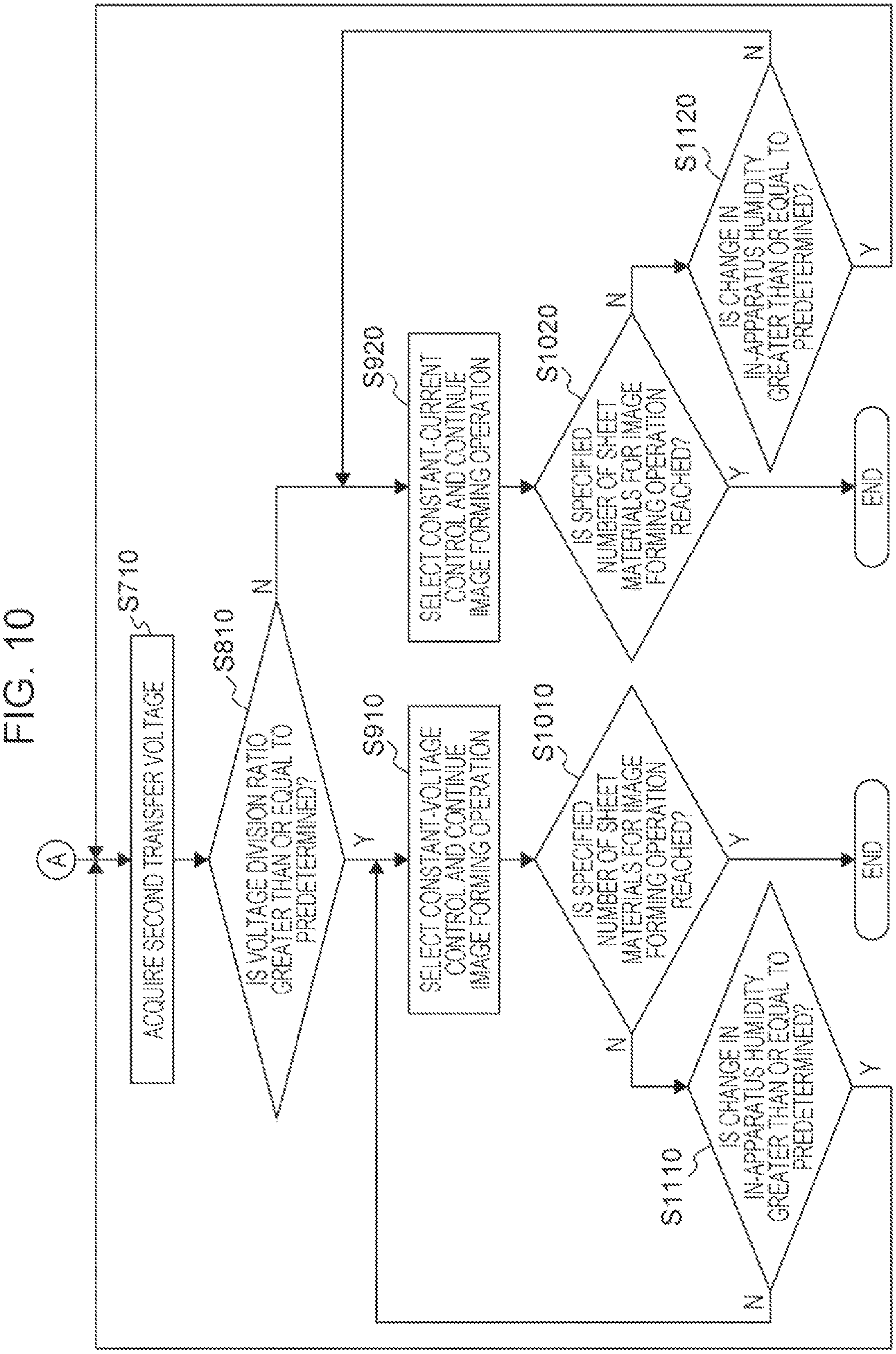
FIG. 10 is a continuation of the flow chart illustrating how to determine the transfer scheme to be selected in the image forming apparatus according to the first exemplary embodiment of the present disclosure.
Figure 11:
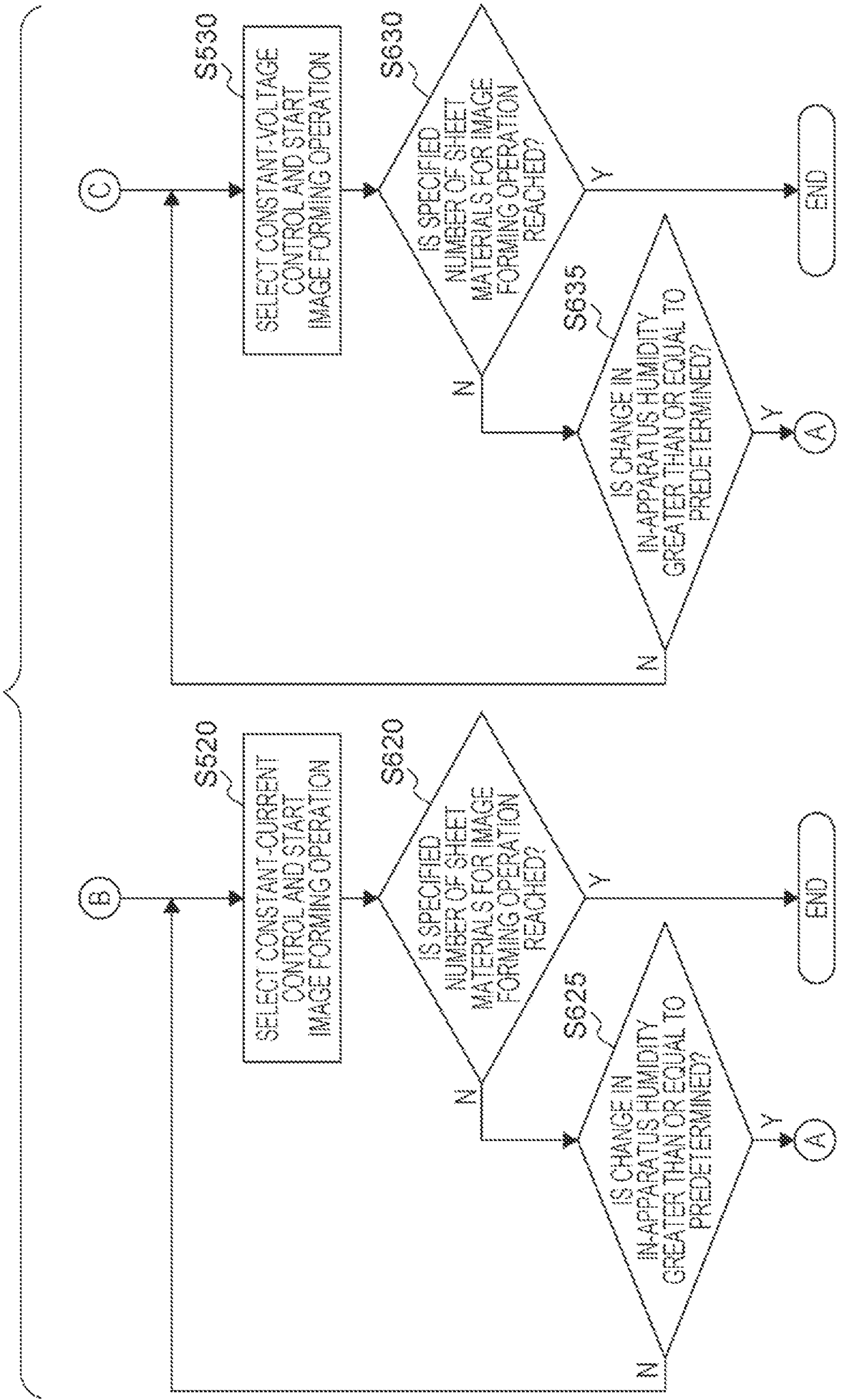
FIG. 11 is a continuation of the flow chart illustrating how to determine the transfer scheme to be selected in the image forming apparatus according to the first exemplary embodiment of the present disclosure.

An operation process in which the control unit 36 of the image forming apparatus 10 controls the high-voltage power source 68 will now be described with reference to the flow charts illustrated in FIGS. 9 to 11. Medium information regarding the sheet materials P contained in the containers 70 is inputted in advance on the input unit 74 by the user.

When the main power of the image forming apparatus 10 illustrated in FIG. 1 is off, none of the elements of the image forming apparatus 10 are in operation.

When the user turns on the main power of the image forming apparatus 10, step S100 starts, in which the control unit 36 illustrated in FIG. 1 controls the high-voltage power source 68 to supply a current of a predetermined value (amperage) to the roll 32*b* before starting an image forming operation. Furthermore, the acquiring part 92 of the control unit 36 acquires from the voltmeter 78 the transfer voltage generated between the second-transfer roll 54 and the roll 32*b* when a current is supplied to the roll 32*b* (the voltage is hereinafter referred to as “first transfer voltage”).

Subsequently, when the user instructs the image forming apparatus 10 to perform an image forming operation for forming an image on any of the sheet materials P, the process proceeds to step S200.

In step S200, the acquiring part 92 acquires medium information on the sheet materials P to be used in the image forming operation.

In step S300, the determining part 96 calculates the above length ratio from the medium information on the sheet materials P that has been acquired by the acquiring part 92 and from the length of the second-transfer part NT in the axial direction, and determines whether the length ratio is smaller than the predetermined ratio.

Specifically, the determining part 96 determines whether the length ratio is smaller than 0.6. If the length ratio is smaller than 0.6, the process proceeds to step S400. If the length ratio is 0.6 or greater, the process proceeds to step S410.

In step S400, the determining part 96 determines to select constant-voltage control, and the image forming operation for the sheet materials P is started.

In step S500, the determining part 96 determines whether the number of sheet materials P having undergone the image forming operation has reached the number specified by the user. If the specified number is yet to be reached, the process proceeds to step S610. If the specified number is reached, the entire process ends.

In step S610, the acquiring part 92 acquires the in-apparatus humidity information measured by the hygrometer 58 provided in the apparatus body 10*a*. If there is any change in the humidity that is greater than or equal to a predetermined value after the last determination of the transfer scheme by the determining part 96, the process proceeds to step S710. If there is no change in the humidity that is greater than or equal to the predetermined value, the process proceeds to step S400 and the image forming operation is continued.

In step S710, the acquiring part 92 acquires from the voltmeter 78 the transfer voltage generated between the second-transfer roll 54 and the roll 32*b* with a sheet material P nipped therebetween at the second-transfer part NT (the voltage is hereinafter referred to as “second transfer voltage”). Specifically, in step S400, the acquiring part 92 acquires from the voltmeter 78 the latest value of the second transfer voltage generated while images are formed on the sheet materials P.

In step S810, the deriving part 94 derives the voltage division ratio γ, which is calculated by Expression (1) below:

$$\gamma=(Vp-Vm)/Vm \qquad (1)$$

Then, the determining part 96 determines whether the voltage division ratio γ calculated by Expression (1) is greater than or equal to a predetermined voltage division ratio. If the calculated voltage division ratio γ is greater than or equal to the predetermined voltage division ratio, the process proceeds to step S910. If the calculated voltage division ratio γ is smaller than the predetermined voltage division ratio, the process proceeds to step S920.

What is meant by Expression (1) is as follows.

Vm denotes the voltage generated between the roll 32*b* and the second-transfer roll 54 with no sheet material P nipped therebetween. That is, Vm denotes the voltage generated with a bulk resistance exhibited by the roll 32*b* and the second-transfer roll 54 (the voltage is hereinafter referred to as “bulk voltage”).

Vp denotes the voltage generated between the roll 32*b* and the second-transfer roll 54 with a sheet material P nipped therebetween. That is, Vp denotes the voltage generated with a combined resistance obtained by adding the bulk resistance and the resistance exhibited by the sheet member P (the voltage is hereinafter referred to as “combined voltage”).

Accordingly, Vp−Vm expresses the partial voltage for the sheet material P. Hence, the voltage division ratio γ, which is the ratio of the partial voltage to the bulk voltage, is translated into the ratio of the current leaking from the two ends of the sheet material P.

In view of the above, a situation where the voltage division ratio γ is greater than or equal to the predetermined voltage division ratio means that the ratio of the current leaking from the two ends of the sheet material P is large, which indicates that constant-voltage control is to be selected. On the other hand, a situation where the voltage division ratio γ is smaller than the predetermined voltage division ratio means that the ratio of the current leaking from the two ends of the sheet material P is small, which indicates that constant-current control is to be selected.

Furthermore, since the bulk resistance and the combined resistance change with the change in the in-apparatus humidity, whether to select constant-voltage control or constant-current control is to be determined in accordance with Expression (1) given above.

In step S910, the determining part 96 determines to select constant-voltage control, and the image forming operation for the sheet materials P is continued.

In step S1010, the determining part 96 determines whether the number of sheet materials P having undergone the image forming operation has reached the number specified by the user. If the specified number is yet to be reached, the process proceeds to step S1110. If the specified number is reached, the entire process ends.

In step S1110, the acquiring part 92 acquires the in-apparatus humidity information measured by the hygrometer 58 provided in the apparatus body 10*a*. If there is any change in the humidity that is greater than or equal to the predetermined value after the last determination of the transfer scheme by the determining part 96, the process proceeds to step S710. If there is no change in the humidity that is greater than or equal to the predetermined value, the process proceeds to step S910 and the image forming operation is continued. Then, the above process is repeated.

If the voltage division ratio γ derived in step S810 is smaller than the predetermined voltage division ratio and the process proceeds to step S920, the determining part 96 determines to select constant-current control in step S920 and the image forming operation for the sheet materials P is started.

In step S1020, the determining part 96 determines whether the number of sheet materials P having undergone the image forming operation has reached the number specified by the user. If the specified number is yet to be reached, the process proceeds to step S1120. If the specified number is reached, the entire process ends.

In step S1120, the acquiring part 92 acquires the in-apparatus humidity information measured by the hygrometer 58 provided in the apparatus body 10*a*. If there is any change in the humidity that is greater than or equal to the predetermined value after the last determination of the transfer scheme by the determining part 96, the process proceeds to step S710. If there is no change in the humidity that is greater than or equal to the predetermined value, the process proceeds to step S920 and the image forming operation is continued. Then, the above process is repeated.

If the length ratio calculated in step S300 is 0.6 or greater and the process proceeds to step S410, the determining part 96 determines in step S410 whether the basis weight of the sheet material P is smaller than the predetermined basis weight.

Specifically, if the length ratio is 0.6 or greater but smaller than 0.9, the determining part 96 determines whether the basis weight of the sheet material P is smaller than 220 [g/m2]. If the length ratio is 0.9 or greater, the determining part 96 determines whether the basis weight of the sheet material P is smaller than 225 [g/m2].

If the basis weight of the sheet material P is smaller than the predetermined basis weight, the process proceeds to step S520. If the basis weight of the sheet material P is greater than or equal to the predetermined basis weight, the process proceeds to step S530.

In step S520, the determining part 96 determines to select constant-current control, and the image forming operation for the sheet materials P is started.

In step S620, the determining part 96 determines whether the number of sheet materials P having undergone the image forming operation has reached the number specified by the user. If the specified number is yet to be reached, the process proceeds to step S625. If the specified number is reached, the entire process ends.

In step S625, the acquiring part 92 acquires the in-apparatus humidity information measured by the hygrometer 58 provided in the apparatus body 10*a*. If there is any change in the humidity that is greater than or equal to the predetermined value after the last determination of the transfer scheme by the determining part 96, the process proceeds to step S710 and the above process is repeated. If there is no change in the humidity that is greater than or equal to the predetermined value, the process proceeds to step S520 and the image forming operation is continued.

If the basis weight of the sheet material P determined in step S410 is greater than or equal to the predetermined basis weight and the process proceeds to step S530, the determining part 96 determines to select constant-voltage control in step S530 and the image forming operation for the sheet materials P is started.

In step S630, the determining part 96 determines whether the number of sheet materials P having undergone the image forming operation has reached the number specified by the user. If the specified number is yet to be reached, the process proceeds to step S635. If the specified number is reached, the entire process ends.

In step S635, the acquiring part 92 acquires the in-apparatus humidity information measured by the hygrometer 58 provided in the apparatus body 10*a*. If there is any change in the humidity that is greater than or equal to the predetermined value after the last determination of the transfer scheme by the determining part 96, the process proceeds to step S710 and the above process is repeated. If there is no change in the humidity that is greater than or equal to the predetermined value, the process proceeds to step S530 and the image forming operation is continued.

Summary

To summarize, in the image forming apparatus 10, if the length ratio is smaller than the predetermined ratio of 0.6, the image forming operation is started under constant-voltage control. Specifically, whether to select constant-voltage control or constant-current control is determined in view of the current that flows through the sheet material P at the second-transfer part NT and the current that leaks from the two ends of the sheet material P.

Furthermore, in the image forming apparatus 10, if the length ratio is greater than or equal to the predetermined ratio, constant-current control is selected for a basis weight of the sheet material P that is smaller than the predetermined basis weight, whereas constant-voltage control is selected for a basis weight of the sheet material P that is greater than or equal to the predetermined basis weight.

Furthermore, in the image forming apparatus 10, if a predetermined environmental change occurs, the voltage division ratio γ is derived and whether to select constant-voltage control or constant-current control is determined.

Furthermore, in the image forming apparatus 10, the predetermined environmental change refers to a situation where the amount of change in the in-apparatus humidity has reached a predetermined value.

Second Exemplary Embodiment

An exemplary image forming apparatus according to a second exemplary embodiment of the present disclosure will now be described with reference to FIGS. 12 and 13. The following description of the second exemplary embodiment is focused on differences from the first exemplary embodiment.

Configuration

Figure 12:
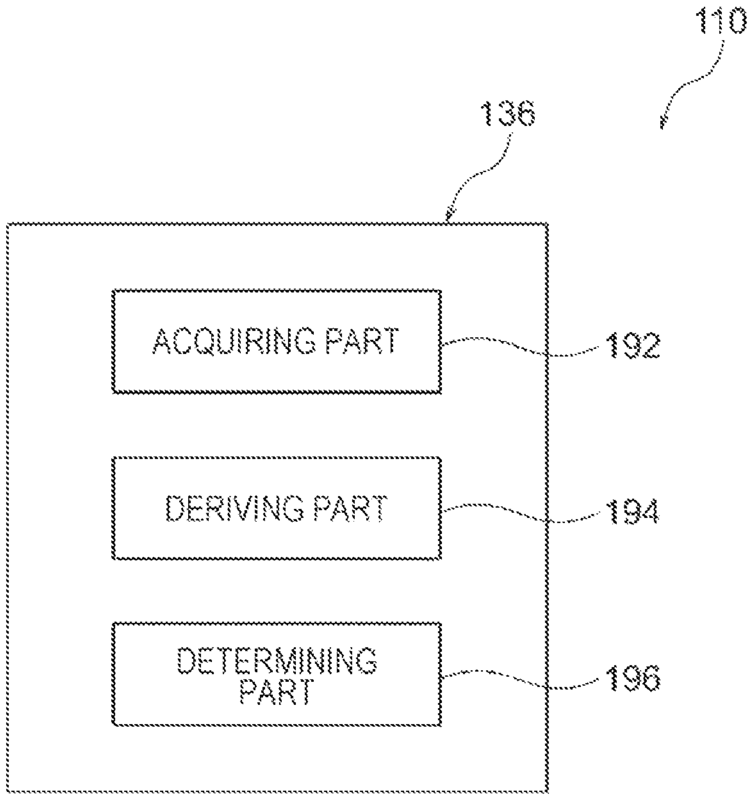
FIG. 12 is a block diagram illustrating a functional configuration of a control unit included in an image forming apparatus according to a second exemplary embodiment of the present disclosure.

Referring to FIG. 12, an image forming apparatus 110 according to the second exemplary embodiment includes a control unit 136, and the control unit 136 includes an acquiring part 192, a deriving part 194, and a determining part 196.

FIG. 13 illustrates a determination table, in accordance with which the determining part 196 determines whether to select constant-voltage control (represented by V in the table) or constant-current control (represented by A in the table). The determination table will now be described.

The in-apparatus humidity is classified into a range of high humidity, a range of moderate humidity, and a range of low humidity. Furthermore, the length ratio is classified into a plurality of ranges for each range of humidity. Specific ranges of length ratio are as follows: a length ratio smaller than 0.6, a length ratio of 0.6 or greater but smaller than 0.9, and a length ratio of 0.9 or greater.

Furthermore, the basis weight of the sheet material P is classified into a plurality of ranges for each of the ranges of length ratio classified for each of the ranges of high humidity, moderate humidity, and low humidity.

Specifically, in the range of length ratio smaller than 0.6, constant-voltage control is selected regardless of the in-apparatus humidity and the basis weight of the sheet material P.

In the range of high humidity and in the range of length ratio of 0.6 or greater but smaller than 0.9, constant-current control is selected for thin paper and plain paper. Furthermore, in the range of high humidity and in the range of length ratio of 0.6 or greater but smaller than 0.9, constant-voltage control is selected for thick paper 1, thick paper 2, thick paper 3, and thick paper 4. Furthermore, in the range of high humidity and in the range of length ratio of 0.9 or greater, constant-current control is selected for thin paper, plain paper, and thick paper 1. Furthermore, in the range of high humidity and in the range of length ratio of 0.9 or greater, constant-voltage control is selected for thick paper 2, thick paper 3, and thick paper 4.

In the range of moderate humidity and in the range of length ratio of 0.6 or greater but smaller than 0.9, constant-current control is selected for thin paper, plain paper, and thick paper 1. Furthermore, in the range of moderate humidity and in the range of length ratio of 0.6 or greater but smaller than 0.9, constant-voltage control is selected for thick paper 2, thick paper 3, and thick paper 4. Furthermore, in the range of moderate humidity and in the range of length ratio of 0.9 or greater, constant-current control is selected for thin paper, plain paper, thick paper 1, and thick paper 2. Furthermore, in the range of moderate humidity and in the range of length ratio of 0.9 or greater, constant-voltage control is selected for thick paper 3 and thick paper 4.

In the range of low humidity and in the range of length ratio of 0.6 or greater but smaller than 0.9, constant-current control is selected for thin paper, plain paper, thick paper 1, and thick paper 2. Furthermore, in the range of low humidity and in the range of length ratio of 0.6 or greater but smaller than 0.9, constant-voltage control is selected for thick paper 3 and thick paper 4. Furthermore, in the range of low humidity and in the range of length ratio of 0.9 or greater, constant-current control is selected for thin paper, plain paper, thick paper 1, thick paper 2, and thick paper 3. Furthermore, in the range of low humidity and in the range of length ratio of 0.9 or greater, constant-voltage control is selected for thick paper 4.

What is meant by the table illustrated in FIG. 13 is as follows.

When the humidity changes, the bulk resistance exhibited by the roll 32*b* and the second-transfer roll 54 changes. Specifically, when the humidity decreases, the bulk resistance increases. In such an environment, constant-current control may be selected. In view of such circumstances, the table illustrated in FIG. 13 summarizes variations in the determination of whether to select constant-voltage control or constant-current control for different ranges of Feature Operation In the image forming apparatus 110, as described above, if the length ratio is greater than or equal to the predetermined ratio and the basis weight of the sheet material P is within a predetermined range, constant-current control is selected for an in-apparatus humidity that is lower than or equal to a predetermined humidity, whereas constant-voltage control is selected for an in-apparatus humidity that is higher than the predetermined humidity.

Specifically, if the length ratio is 0.6 or greater but smaller than 0.9 and the basis weight of the sheet material P is 105 [g/m2] or greater but smaller than 175 [g/m2], constant-current control is selected for an in-apparatus humidity within the range of moderate humidity or lower, whereas constant-voltage control is selected for an in-apparatus humidity within the range of high humidity that is higher than moderate humidity. In such a case, the range of moderate humidity is the predetermined humidity.

Furthermore, if the length ratio is 0.6 or greater but smaller than 0.9 and the basis weight of the sheet material P is 175 [g/m2] or greater but smaller than 220 [g/m2], constant-current control is selected for an in-apparatus humidity within the range of low humidity or lower, whereas constant-voltage control is selected for an in-apparatus humidity within the ranges of moderate humidity and high humidity that are higher than low humidity. In such a case, the range of low humidity is the predetermined humidity.

Furthermore, if the length ratio is 0.9 or greater and the basis weight of the sheet material P is 220 [g/m2] or greater but smaller than 225 [g/m2], constant-current control is selected for an in-apparatus humidity within the range of low humidity or lower, whereas constant-voltage control is selected for an in-apparatus humidity within the ranges of moderate humidity and high humidity that are higher than low humidity. In such a case, the range of low humidity is the predetermined humidity.

Summary

To summarize, if the length ratio is 0.6 or greater and the basis weight of the sheet material P is within the predetermined range, constant-current control is selected for an in-apparatus humidity that is lower than or equal to the predetermined humidity, whereas constant-voltage control is selected for an in-apparatus humidity that is higher than the predetermined humidity.

While some exemplary embodiments of the present disclosure have been described in detail, the present disclosure is not limited thereto. It is obvious to those skilled in the art that various other embodiments are conceivable within the scope of the present disclosure. For example, while the above exemplary embodiments each relate to a case where the transfer scheme is redetermined if the predetermined environmental change occurs, the transfer scheme does not necessarily need to be redetermined. However, such an embodiment does not produce the effects produced by the exemplary embodiment where the transfer scheme is redetermined if the predetermined environmental change occurs.

While the above exemplary embodiments each relate to a case where the transfer scheme is redetermined if the amount of change in the in-apparatus humidity reaches a predetermined value, the transfer scheme may be redetermined if, for example, the amount of change in the in-apparatus temperature reaches a predetermined value. However, such an embodiment does not produce the effects produced by the exemplary embodiment where the transfer scheme is redetermined if the amount of change in the in-apparatus humidity reaches a predetermined value.

While the above exemplary embodiments make no reference to specific values of humidity, an exemplary range of "high humidity" is higher than 70%, an exemplary range of "moderate humidity" is higher than 30% but 70% or lower, and an exemplary range of "low humidity" is 30% or lower.

While the above exemplary embodiments make no reference to specific values of the voltage to be applied under constant-voltage control and the current to be supplied under constant-current control, such a voltage and a current may be obtained as the results of, for example, monitoring the voltage applied to the transfer member 56 and the current flowing through the transfer member 56.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image forming apparatus comprising:

a circulating member to be made to circulate while carrying a toner image on a peripheral surface;

a transfer member configured to nip at a nip part a recording medium that is transported and the circulating member and to transfer the toner image on the circulating member to the recording medium with a voltage being applied to the transfer member; and a controller configured to control a transfer scheme in accordance with which a voltage is to be applied to the transfer member, the controller being capable of switching the transfer scheme between constant-voltage control and constant-current control, the controller causing an image forming section configured to form an image on the circulating member to start an image forming operation under constant-voltage control selected as the transfer scheme if a length ratio defined as a ratio of a length of the recording medium in an axial direction to a length of the nip part in the axial direction is smaller than a predetermined ratio.

(((2)))

The image forming apparatus according to (((1))), wherein if the length ratio is greater than or equal to the predetermined ratio, the controller causes the image forming section to start an image forming operation under constant-current control as the transfer scheme if the recording medium has a basis weight that is smaller than a predetermined basis weight or under constant-voltage control as the transfer scheme if the recording medium has a basis weight that is greater than or equal to the predetermined basis weight.

(((3)))

The image forming apparatus according to (((1))) or (((2))), wherein if the length ratio is greater than or equal to the predetermined ratio and the basis weight is within a predetermined range, the controller selects as the transfer scheme constant-current control if an in-apparatus humidity is lower than or equal to a predetermined humidity or constant-voltage control if the in-apparatus humidity is higher than the predetermined humidity.

(((4)))

The image forming apparatus according to any one of (((1))) to (((3))), wherein the controller selects constant-voltage control if a voltage division ratio γ is greater than or equal to a predetermined voltage division ratio or constant-current control if the voltage division ratio γ is smaller than the predetermined voltage division ratio, the voltage division ratio γ being calculated by Expression (1):

$$\gamma=(Vp-Vm)/Vm \quad (1)$$

where Vm denotes a first transfer voltage generated before an image forming operation is started and when a predetermined amperage of current is supplied to the transfer member with no recording medium being nipped at the nip part, and Vp denotes a second transfer voltage generated if a predetermined environmental change occurs after the image forming operation is started and when the predetermined amperage of current is supplied to the transfer member with a recording medium being nipped at the nip part.

(((5)))

The image forming apparatus according to (((4))), wherein the predetermined environmental change is a change in an in-apparatus humidity, and wherein the controller acquires the voltage division ratio γ if an amount of change in the in-apparatus humidity reaches a predetermined value, and the controller selects constant-voltage control or constant-current control in accordance with the acquired voltage division ratio γ.

What is claimed is:

1. An image forming apparatus comprising:

a circulating belt configured to circulate while carrying a toner image on a peripheral surface;

a transfer member configured to nip, at a nip part, a recording medium that is transported and the circulating belt, and configured to transfer the toner image on the circulating belt to the recording medium with a voltage being applied to the transfer member; and a controller configured to control a transfer scheme in accordance with which a voltage is to be applied to the transfer member, wherein the controller is configured to switch the transfer scheme between constant-voltage control and constant-current control, and wherein the controller is configured to cause an image forming section configured to form an image on the circulating belt to start an image forming operation under constant-voltage control, and not constant-current control, selected as the transfer scheme in response to the controller determining that a length ratio, which is defined as a ratio of a length of the recording medium in an axial direction to a length of the nip part in the axial direction, is smaller than a predetermined ratio.

2. The image forming apparatus according to claim 1, wherein the controller is configured to, in response to the controller determining that the length ratio is greater than or equal to the predetermined ratio:

cause the image forming section to start an image forming operation under constant-current control as the transfer scheme in response to the controller determining that the recording medium has a basis weight that is smaller than a predetermined basis weight; and cause the image forming section to start the image forming operation under constant-voltage control as the transfer scheme in response to the controller determining that the recording medium has a basis weight that is greater than or equal to the predetermined basis weight.

3. The image forming apparatus according to claim 2, wherein the controller is configured to, in response to the controller determining that the length ratio is greater than or equal to the predetermined ratio and the basis weight is within a predetermined range:

select as the transfer scheme constant-current control in response to the controller determining that an in-apparatus humidity is lower than or equal to a predetermined humidity; and select as the transfer scheme constant-voltage control in response to the controller determining that the in-apparatus humidity is higher than the predetermined humidity.

4. The image forming apparatus according to claim 1, wherein the controller is configured to:

select constant-voltage control in response to the controller determining that a voltage division ratio γ is greater than or equal to a predetermined voltage division ratio; and select constant-current control in response to the controller determining that the voltage division ratio γ is smaller than the predetermined voltage division ratio, the voltage division ratio γ being calculated by Expression (1):

$$\gamma=(Vp-Vm)/Vm \quad (1)$$

where Vm denotes a first transfer voltage generated before an image forming operation is started and when a predetermined amperage of current is supplied to the transfer member with no recording medium being nipped at the nip part, and Vp denotes a second transfer voltage generated in a case where a predetermined environmental change occurs after the image forming operation is started and when the predetermined amperage of current is supplied to the transfer member with a recording medium being nipped at the nip part.

5. The image forming apparatus according to claim 4, wherein the predetermined environmental change is a change in an in-apparatus humidity, wherein the controller is configured to acquire the voltage division ratio γ in response to the controller determining that an amount of change in the in-apparatus humidity reaches a predetermined value, and wherein the controller is configured to select constant-voltage control or constant-current control in accordance with the acquired voltage division ratio γ.

6. An image forming apparatus comprising:

a circulating member for circulating while carrying a toner image on a peripheral surface;

transfer means for nipping, at a nip part, a recording medium that is transported and the circulating member, and for transferring the toner image on the circulating member to the recording medium with a voltage being applied to the transfer means; and a controller means for controlling a transfer scheme in accordance with which the voltage is to be applied to the transfer means, wherein the controller means is for switching the transfer scheme between constant-voltage control and constant-current control, wherein the controller means is for causing an image forming section configured to form an image on the circulating member to start an image forming operation under constant-voltage control, and not constant-current control, selected as the transfer scheme in response to the controller means determining that a length ratio, which is defined as a ratio of a length of the recording medium in an axial direction to a length of the nip part in the axial direction, is smaller than a predetermined ratio.

7. An image forming apparatus comprising:

a circulating belt configured to circulate while carrying a toner image on a peripheral surface;

a transfer member configured to nip, at a nip part, a recording medium that is transported and the circulating belt, and configured to transfer the toner image on the circulating belt to the recording medium with a voltage being applied to the transfer member; and a controller configured to control a transfer scheme in accordance with which a voltage is to be applied to the transfer member, wherein the controller is configured to switch the transfer scheme between constant-voltage control and constant-current control, wherein the controller is configured to cause an image forming section configured to form an image on the circulating belt to start an image forming operation under constant-voltage control selected as the transfer scheme in a case where a length ratio, which is defined as a ratio of a length of the recording medium in an axial direction to a length of the nip part in the axial direction, is smaller than a predetermined ratio, wherein the controller is configured to:

select constant-voltage control in a case where a voltage division ratio γ is greater than or equal to a predetermined voltage division ratio; and select constant-current control in a case where the voltage division ratio γ is smaller than the predetermined voltage division ratio, the voltage division ratio γ being calculated by Expression (1):

$$\gamma=(Vp-Vm)/Vm \quad (1)$$

where Vm denotes a first transfer voltage generated before an image forming operation is started and when a predetermined amperage of current is supplied to the transfer member with no recording medium being nipped at the nip part, and Vp denotes a second transfer voltage generated in a case where a predetermined environmental change occurs after the image forming operation is started and when the predetermined amperage of current is supplied to the transfer member with a recording medium being nipped at the nip part, wherein the predetermined environmental change is a change in an in-apparatus humidity, wherein the controller is configured to acquire the voltage division ratio γ in a case where an amount of change in the in-apparatus humidity reaches a predetermined value, and wherein the controller is configured to select constant-voltage control or constant-current control in accordance with the acquired voltage division ratio γ.

* * * * *